(12) United States Patent
Gupta et al.

(10) Patent No.: US 11,663,296 B2
(45) Date of Patent: May 30, 2023

(54) AUTOMATIC WORK ORDER ANALYSIS

(71) Applicant: NBN Co Limited, North Sydney (AU)

(72) Inventors: Amit Kumar Gupta, Sydney (AU);
Michael Julian Joyce, Sydney (AU);
Alexandre Luis Kundrat Eisenmann,
Sydney (AU); Jason Leong, Sydney
(AU); Diahann Holmes, Sydney (AU);
Moumtaiz Nasser, Docklands (AU)

(73) Assignee: NBN Co Limited, North Sydney (AU)

( * ) Notice: Subject to any disclaimer, the term of this patent is extended or adjusted under 35 U.S.C. 154(b) by 385 days.

(21) Appl. No.: 17/010,489

(22) Filed: Sep. 2, 2020

(65) Prior Publication Data

US 2022/0067454 A1    Mar. 3, 2022

(51) Int. Cl.

| | |
|---|---|
| *G06F 18/2411* | (2023.01) |
| *G06F 16/535* | (2019.01) |
| *G06F 16/55* | (2019.01) |
| *G06F 16/58* | (2019.01) |
| *G06N 3/08* | (2023.01) |
| *G06F 18/214* | (2023.01) |

(52) U.S. Cl.
CPC ........ *G06F 18/2411* (2023.01); *G06F 16/535* (2019.01); *G06F 16/55* (2019.01); *G06F 16/58* (2019.01); *G06F 18/214* (2023.01); *G06N 3/08* (2013.01)

(58) Field of Classification Search
CPC .. G06K 9/6269; G06K 9/6256; G06F 16/535; G06F 16/55; G06F 16/58; G06N 3/08; G06N 3/04; G06N 3/084; G06V 10/255; G06V 10/82; G06V 10/757
See application file for complete search history.

(56) References Cited

U.S. PATENT DOCUMENTS

| | | | | |
|---|---|---|---|---|
| 2,589,812 | A * | 3/1952 | Hoskins | G07C 3/12 |
| | | | | 434/108 |
| 10,361,866 | B1 * | 7/2019 | McGregor | H04L 9/0637 |
| 2012/0095926 | A1 * | 4/2012 | Nishimura | G06Q 10/06 |
| | | | | 705/301 |
| 2013/0110568 | A1 * | 5/2013 | Cheng | G06Q 10/06 |
| | | | | 705/7.14 |
| 2017/0169292 | A1 * | 6/2017 | Guzman | G06Q 30/04 |
| 2020/0051039 | A1 * | 2/2020 | Jurich | G06Q 20/145 |
| 2020/0051066 | A1 * | 2/2020 | Jurich | H04L 9/50 |
| 2021/0073898 | A1 * | 3/2021 | Saiz Serrano | G06K 1/18 |
| 2021/0110299 | A1 * | 4/2021 | Bisson-Krol | G06N 3/105 |

(Continued)

*Primary Examiner* — Lewis G West
(74) *Attorney, Agent, or Firm* — Polsinelli PC

(57) ABSTRACT

The present disclosure relates to computer implemented methods and systems for processing of workorder evidence. The workorder has associated objects of interest and metadata describing at least one workorder attribute. Workorder evidence to be processed comprises an image. The image is validated to assess whether the image is associated with the workorder. Validation comprises one or both of comparing image attributes to workorder attributes to detect a match, and comparing the image to previous images to ensure that the image is not a match for a previous image. The system or method detects whether an object of interest is depicted in the image using an object detection algorithm. The workorder evidence is classified depending on whether the image is detected as valid and the object or interest is detected in the image.

21 Claims, 5 Drawing Sheets

(56) References Cited

U.S. PATENT DOCUMENTS

| | | | |
|---|---|---|---|
| 2021/0150338 A1* | 5/2021 | Semenov | G06V 30/224 |
| 2021/0157833 A1* | 5/2021 | Wolkowicz | G06F 16/583 |
| 2022/0171982 A1* | 6/2022 | Gosinski | G06F 16/51 |
| 2022/0230188 A1* | 7/2022 | Withrow | G06K 9/6215 |

* cited by examiner

AUTOMATIC WORK ORDER ANALYSIS

TECHNICAL FIELD

The invention relates generally to computer implemented methods and systems for validating a workorder, and in particular to verifying whether the workorder has been satisfactorily finished via image analysis.

BACKGROUND OF INVENTION

Large organisations, such as those in the building, telecommunications, plumbing, electricity supply, general maintenance or gas supply sectors to name a few, will often require work to be conducted by contractors, who are in some cases business partners. These contractors may not be direct employees of the business, but will often perform work on behalf of the organisation in question for a large proportion or all of their annual work time. The organisation will send a workorder to the contractor or an intermediary entity when a job involving one or more tasks is to be performed. Similarly, a workorder may be sent to an internal employee of the organisation to carry out.

In these situations, evidence may be required to be provided by the contractor or employee to demonstrate that the workorder has been completed, together with an invoice in the case of a contractor. Commonly, the evidence, mainly in the form of images such as photographs, maps and/or documents, will be processed by an individual, or preferably a team for large organisations, at the instructing organisation for its validation and to approve payment of the invoice, where necessary. The processing is carried out manually by the individual or team. Often, a completed workorder will be accompanied by as many as 30 or more pieces of evidence, which places a burden on the individual or team processing that workorder. In addition, some organisations may instruct large numbers of contractors or employees to perform workorders each day, potentially ranging up to hundreds or thousands of workorders each day depending on the size of organisation and industry sector.

In some cases, evidence may be falsified by the contractor or employee, including reusing photographic evidence or other documents from one worksite to verify work at another worksite. The manual processing of the workorder evidence takes up a large amount of time and it is extremely difficult for the individual or team to detect where falsified evidence has been provided. It is not practically possible for the individual or team to review the evidence provided in a batch against all previous evidence to make a manual assessment of whether sufficient evidence is provided to demonstrate a workorder has been completed and if any falsified evidence has been submitted following the workorder. Thus, falsified evidence is often missed. The acceptance of workorders having evidence that is falsified and potentially approval of payment thereof may result in customers of that organisation having work that has not been carried out correctly or in its entirety or may potentially later require a further workorder to be sent to complete the job, potentially at additional cost. In addition, receiving unfalsified evidence is necessary to ensure that the workorder has been completed safely and using the correct equipment for each task.

It is therefore desirable to provide a system or method which may overcome one or more of the problems associated with situations similar to those described above. For example, it would be desirable, at least as a preferred embodiment, to provide a method or system for autonomously processing evidence of completion of workorders to verify the validity of the evidence or to classify the evidence.

Any reference to or discussion of any document, act or item of knowledge in this specification is included solely for the purpose of providing a context for the present invention. It is not suggested or represented that any of these matters or any combination thereof formed at the priority date part of the common general knowledge, or was known to be relevant to an attempt to solve any problem with which this specification is concerned.

SUMMARY OF INVENTION

According to a first aspect, there is provided a computer implemented method for classifying workorder evidence provided for a workorder having at least one object of interest and workorder metadata describing at least one required workorder attribute, said workorder evidence comprising an image, wherein the method comprises:

validating the image to assess whether the image is associated with the workorder, wherein validating the image comprises at least one of the following comparison steps:
  a) processing any available image metadata as image attributes of the image, and comparing whether the at least one required workorder attribute is matched by any image attribute, the comparison requiring a match; and
  b) comparing whether the image is a match for any of a plurality of previous images stored in an image storage, the comparison requiring that there are no matches,
  wherein, the image is valid if the or each comparison step is met, detecting whether the at least one object of interest is depicted in the image, utilising an object detection algorithm capable of identifying the at least one object of interest; and classifying whether the workorder evidence satisfies the workorder based on whether the image is valid and the at least one object of interest is detected.

The aspect provided herein and/or as further described below may be advantageous over conventional methods by improving efficiency and speed of the processing of workorder evidence. The present disclosure may also provide improved accuracy and may permit automated detection of falsified or duplicated evidence, which would not have been previously possible through manual evidence processing methods. For example, there may be tens of thousands, or potentially millions, of stored images from previous workorders, and it would be impossible for an individual processing a new workorder for approval to review each piece of evidence of the new workorder against every stored image. The present methods and systems can perform this task which could not be conducted manually.

Prior to the present disclosure, an auditing process would be carried out manually on evidence submitted for a selection of workorders based on a set of business rules, such as only processing the most valuable workorders. That is, a selection of workorder evidence submitted would be scrutinised by an assessing person to determine that the workorder evidence is acceptable, with the remaining workorders passed without audit. Whereas, according to the present disclosure an automated computer system can review all submitted evidence on all workorders and make an automated decision of whether all objects of interest are present or not within a predetermined degree of accuracy. Therefore, only those pieces of evidence which are flagged by the system as being outside the certainty levels of acceptability may need to be scrutinised.

According to embodiments, step b) comprises determining whether the image is an exact duplicate of any previous image.

According to embodiments, the object detection algorithm comprises a trained neural network. Optionally, the object detection algorithm may comprise a feature points based object identification method.

According to embodiments, the image and the plurality of previous images is a photograph, preferably a natural image photograph. A deep learning classification model may be used in the method to determine that the image is a photograph.

According to embodiments, step b) comprises calculating an image feature vector for the image, wherein each previous image has an associated image feature vector. Preferably, a trained deep learning neural network model is utilised to calculate the image feature vector for the image. According to embodiments, step b) further comprises calculating a distance between the image feature vector of the image and the associated image feature vector of at least some of the plurality of previous images. Each distance may be compared to at least one threshold value. According to embodiments, step b) further comprises manipulating the image through at least one of cropping, zooming, rotating, and stretching to create a set of manipulated images, and comparing each manipulated image to a set of comparison previous images, being at least a subset of the plurality of previous images, to determine whether the image is a match to a previous image.

According to embodiments, the method further comprises providing a subset of the plurality of previous images as the set of comparison previous images, where the distance is above a first match threshold and below a second no-match threshold. According to embodiments, the method further comprises calculating an image feature vector for each manipulated image, and wherein comparing each manipulated image to the set of comparison previous images comprises calculating a distance between the image feature vector of each manipulated image and an image feature vector of each of the comparison previous images, and comparing the distance to at least one threshold value.

According to embodiments, step b) comprises manipulating the set of comparison previous images through at least one of cropping, zooming, rotating, and stretching to create a set of manipulated previous images, and comparing each manipulated previous image to the image, to determine whether the image is a match to a previous image. According to embodiments, the method further comprises calculating an image feature vector for each manipulated image, and wherein comparing each manipulated image to the set of comparison previous images comprises calculating a distance between the image feature vector of each manipulated image and an image feature vector of each of the comparison previous images, and comparing the distance to at least one threshold value.

According to embodiments, the method further includes pre-processing the image by cropping at least one edge portion from the image.

According to embodiments, an OCR program reads text on the image, the text being image metadata, as the image attributes of step a).

According to embodiments, the image metadata comprises a location of the image, wherein the workorder attribute comprises a workorder location. Preferably, step a) further comprises comparing the location of the image with the workorder location.

According to embodiments, the image metadata comprises a date/time of the image, wherein the workorder attribute comprises a workorder date/time. Preferably, step a) comprises comparing the date/time of the image with the workorder date/time.

According to embodiments, the trained neural network determines a confidence value of the likelihood whether the at least one object of interest is depicted in the image. The computer processing system may compare the confidence value to a positive threshold, to determine whether the object of interest is depicted in the image. The computer processing system may compare the confidence value to a negative threshold, to determine whether the object of interest is not depicted in the image. According to embodiments, if the confidence value is below the positive threshold and above the negative threshold, a determination is made that it is uncertain whether the object of interest is depicted in the image or not. When an uncertain determination is made, the workload evidence may be flagged for further analysis.

According to embodiments, the workorder evidence comprises a plurality of images, wherein each of said plurality of images undergoes at least one of the comparison steps for validation and undergoes detection of the at least one object of interest in the image, and wherein said workorder evidence is classified based on whether the at least one object of interest is present in at least one valid image.

According to embodiments, the method further comprises comparing each image of the plurality of images with each other image of the plurality of images to determine whether any exact duplicates exist within the plurality of images. The method may remove one exact duplicate from each pair of exact duplicates from further processing.

According to another aspect, there is provided a workorder processing system that is configured to perform the method according to any aspect or embodiment described herein.

The system may be implemented in a network using computer systems, smart phones, tablet devices, and/or servers, each of which comprises a processor, a memory and instructions to carry out the method as described.

DEFINITIONS

As used herein the term 'workorder' means a job having at least one work item which is to be carried out or which has been carried out.

As used herein the term 'work item' means a specific task that is to be or that has been carried out within a workorder.

As used herein the term 'object of interest' means an object which has a visual appearance, preferably an item of work equipment. The object of interest may be associated with at least one work item of a workorder. The object of interest should be included in evidence where a workorder is to be validated.

As used herein the term 'evidence' means images, including but not limited to photographs, particularly natural images, computer generated images, screen grabs which are screen displays of a computer, tablet or smartphone that have been captured, documents, or maps. The images that form the evidence may each have associated metadata.

BRIEF DESCRIPTION OF DRAWINGS

Embodiments of the invention will now be described with reference to the accompanying drawings. It is to be understood that the embodiments are given by way of illustration only and the invention is not limited by this illustration. In the drawings.

DETAILED DESCRIPTION

Figure 1:
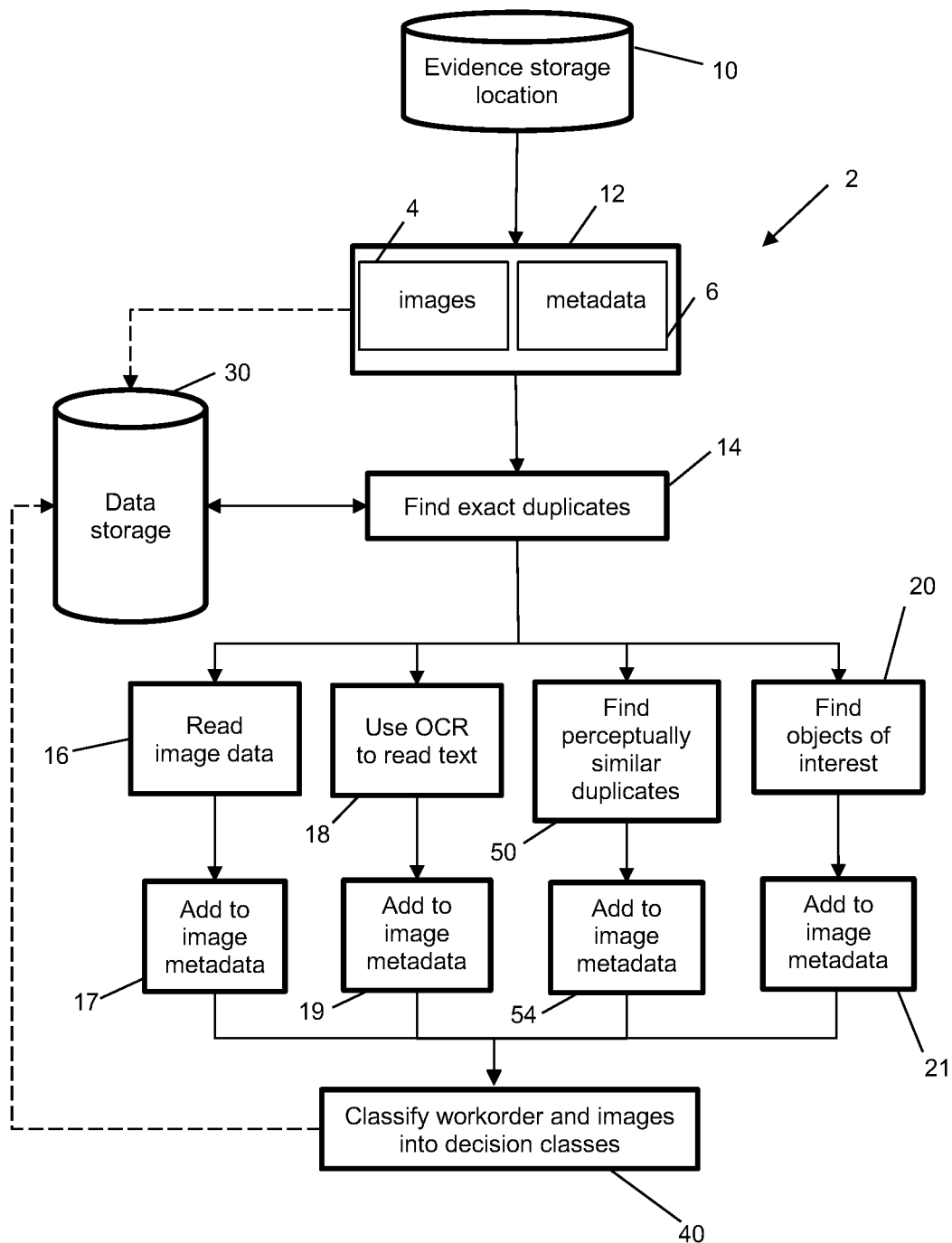
FIG. 1 is a flow chart showing a process according to an embodiment.

An overview of a preferred workorder processing system 2 according to the present disclosure is shown in FIG. 1. However, it will be understood that within the overall scope of the present disclosure, depending on the actual implementation required, one or more of the steps shown in FIG. 1 may be removed or additional steps may be added without diverging from the overall scope.

Evidence of the completion of a workorder will be sent to the instructing organisation, preferably including electronic images and further preferably in an image file format which supports EXIF data, such as jpeg or TIFF, or in other image file formats such as PNG. The evidence may be emailed or otherwise transferred to the organisation, such as through an application designed for the purpose of collecting evidence from contractors of the organisation, and will be associated with a particular workorder existing in the system 2. The evidence will be stored electronically in an evidence storage location 10. The workorder processing system comprises software that will ingest, or process, at ingestion step 12 at least one image, but, usually, a batch of images 4 that are included in the evidence of a workorder from the evidence storage location 10 when it is available. In addition to the images themselves, the software will ingest workorder metadata 6 of the relevant workorder. The workorder metadata 6 will, preferably, include such attributes as the contractor or team assigned the workorder, the assets required for the workorder, a location that the work is to be carried out, a date range for the workorder to be carried out, amongst other relevant details. Step 12 then stores the image file(s) and metadata appropriately, or at least associates the image file(s) with a workorder, such that the metadata 6 is associated with the image file(s), such as in data storage 30, which may be the same data storage as the storage location 10 in some embodiments.

The ingestion step 12 may operate in any one of a plurality of modes which include pull, push and hybrid modes. In the pull mode the software uses source storage APIs (application programming interfaces) to check for new images at a predetermined frequency. For example, in an embodiment, the software runs a check for new images at 15 minute cycles. When evidence of a recent workorder is detected, the images and associated metadata are ingested 12 and stored, or copied, to the data storage 30 of the workorder processing system 2. In the push mode the images 4 and metadata 6 of a workorder are ingested when available at the evidence storage location. The push mode may employ software APIs for performing this task, such as REST (representational state transfer) APIs. In the hybrid mode, the software will work using a combination of push and pull methods. In other words, images and metadata of a workorder could be pulled at an interval where it has not been pushed or the push action may prompt the pull action to activate, or some evidence storage locations 10 may only support pull mode while other evidence storage locations 10 may only support push mode.

The data storage 30 additionally contains previous workorder evidence. The data storage 30 includes each image and its associated metadata which may include millions of images and can be utilised for comparison with evidence of recent workorders ingested by the system 2. Each image in the data storage 30 has a computed hash value stored and associated with it that can be sorted and utilised for reduced comparison times. In this context, a hash value is a form of checksum or cryptographic hash function, which typically outputs a fixed size value which, via the algorithm which generates the hash, provides a significantly different value, even for small changes made to the input.

As an initial step 14 of FIG. 1, after evidence of a workorder is ingested, the system will detect whether any of the ingested images have exact duplicates. In performing the "find exact duplicates" step 14, firstly, a comparison process will take place between each of the images from the ingested batch to detect whether any images have been submitted more than once in the workorder. The comparison will compare the image files to assess whether they are identical, preferably by comparison of computed hash values of each image. Deduplicating the images in the batch can reduce the number of images to be later processed and prevents repeating processing for identical images. If any images are found to be exact duplicates within the batch, only one of these duplicated images will be kept for further processing.

The hash value for each image is also stored in the data storage 30. In addition, the hash value of an image may be saved to the metadata of that image. This is applicable to the ingested images and the images stored in the data storage 30.

Next or simultaneously in the "find exact duplicates" step 14, the ingested images are compared with the previous images stored in the data storage 30 to assess whether any of the batch images is an exact duplicate of an image from previous workorder evidence. Comparing each image of the batch against every image stored in the data storage 30 would not be efficient. Therefore, a hash table is used to efficiently handle this task, allowing the supplicate comparison to be made in a time that is independent of the number of images in the data storage. Once complete, each image in the batch will be marked as either exact duplicate or not exact duplicate. Again, any exact duplicates can be discarded from further processing. Images which are not exact duplicates are processed further by the workorder processing system 2.

At step 16 of FIG. 1, data embedded in the images being processed is read by the system. Commonly, a natural image taken by a camera will have embedded information added by the camera, known as EXIF (Exchangeable image file format) data, as mentioned above. The EXIF data can include geo-tags, where the camera has access to a GPS device or where the location is otherwise known by the camera. The data may also include the time of capture of the photograph as recorded by the camera, amongst other details. Where this data is embedded in an image file, the data is extracted from the image file and added to the stored data for that image, known as image metadata, in the data storage 30. Of course, the image, no matter what form, may include other types of embedded data and, where this data is relevant for the purposes of processing the workorder, that data may be extracted and added to the metadata of the image in the data storage 30, see step 17 of FIG. 1. It is possible that a contractor or employee could alter the EXIF data of an image file where they wish, for example, to make an older image appear as though it was taken at the time of the recent workorder. Therefore, another optional aspect of step 16 is to perform an assessment of the image file to determine whether the EXIF data has been modified. For example, the EXIF data can be examined to assess whether common photo manipulation software, such as Adobe® Photoshop© was used to alter the EXIF data, as Photoshop® typically identifies EXIF edits by writing the software version to the EXIF Software tag.

Figure 3:
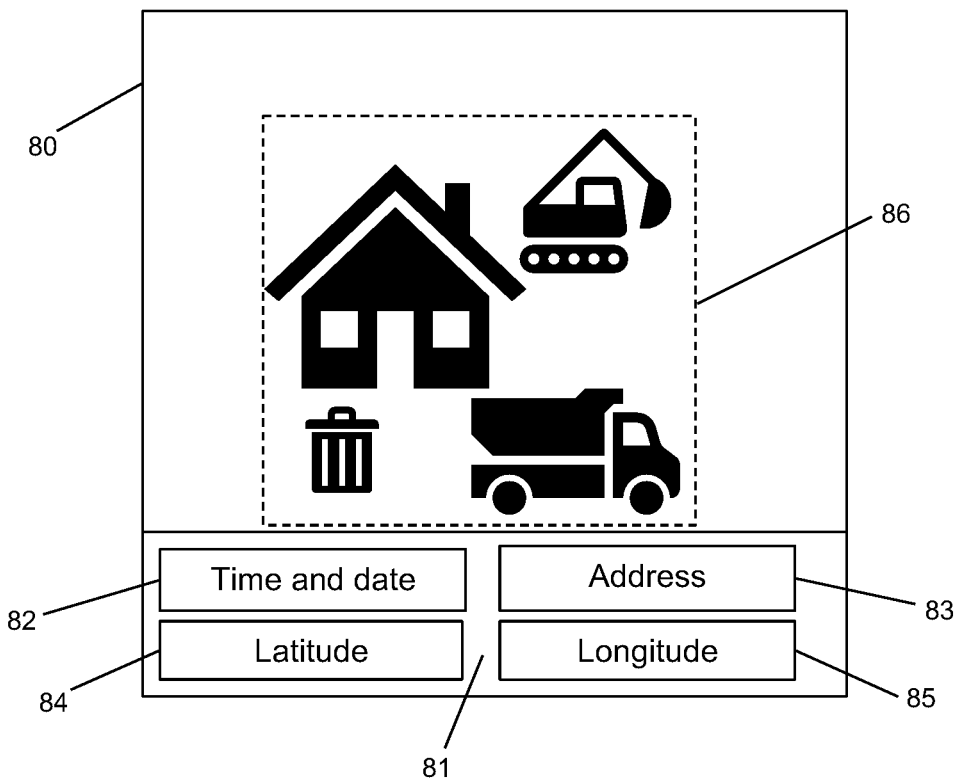
FIG. 3 is an example of an image submitted with a batch of images as evidence of a workorder according to an embodiment.

According to the preferred embodiment, the workorder processing system 2 includes OCR (optical character recognition) software in order to read any text that is within an image, see step 18 of FIG. 1. For example, in some instances an image may include textual information, such as within an information bar at one side/end of the image or otherwise positioned anywhere on the image. The information bar is a section which is not part of the natural image in question and may be a solid or semi-opaque area of colour other than the text, generally black or white. FIG. 3 shows an example of an image 80 which includes an information bar 81 having text thereon. In this example, the text includes the time and date 82 that the image was taken, the physical address 83 where the image was taken and the latitude 84 and the longitude 85 where the image was taken. Similarly, text located on an image, which can be within or not within an information bar, may include date, location, latitude, longitude or other information. Where text relevant to the processing of the image is detected by the OCR software, this information will be extracted and added to the image metadata in the data storage 30, see step 19 of FIG. 1. In cases where location and date information was not present in EXIF data, such as where the image was provided in a file format which does not include EXIF data, then the OCR read location and date may be used as image metadata.

The OCR software may be utilised to read text on an image other than date or location related text. The text read by the OCR software may identify an object of interest in the image. For example, the image may be a photograph of an object of interest having a serial number thereon which can be read by the OCR software. In such cases, the OCR text read could be used to verify the presence of an object of interest in the image, in addition to the object of interest detection at step 20 of FIG. 1, discussed below.

At step 50 of FIG. 1, the workorder processing system 2 will perform processing and further detailed comparison between each batch image 4 and the images of previous evidence in the data storage 30 to assess whether any perceptually similar duplicates are present. This step will preferably match perceptually similar duplicates that exist between any image(s) 4 and a previously stored image. Any exact duplicates which have already been matched through the previous comparison step 14 will be ignored.

Figure 2:
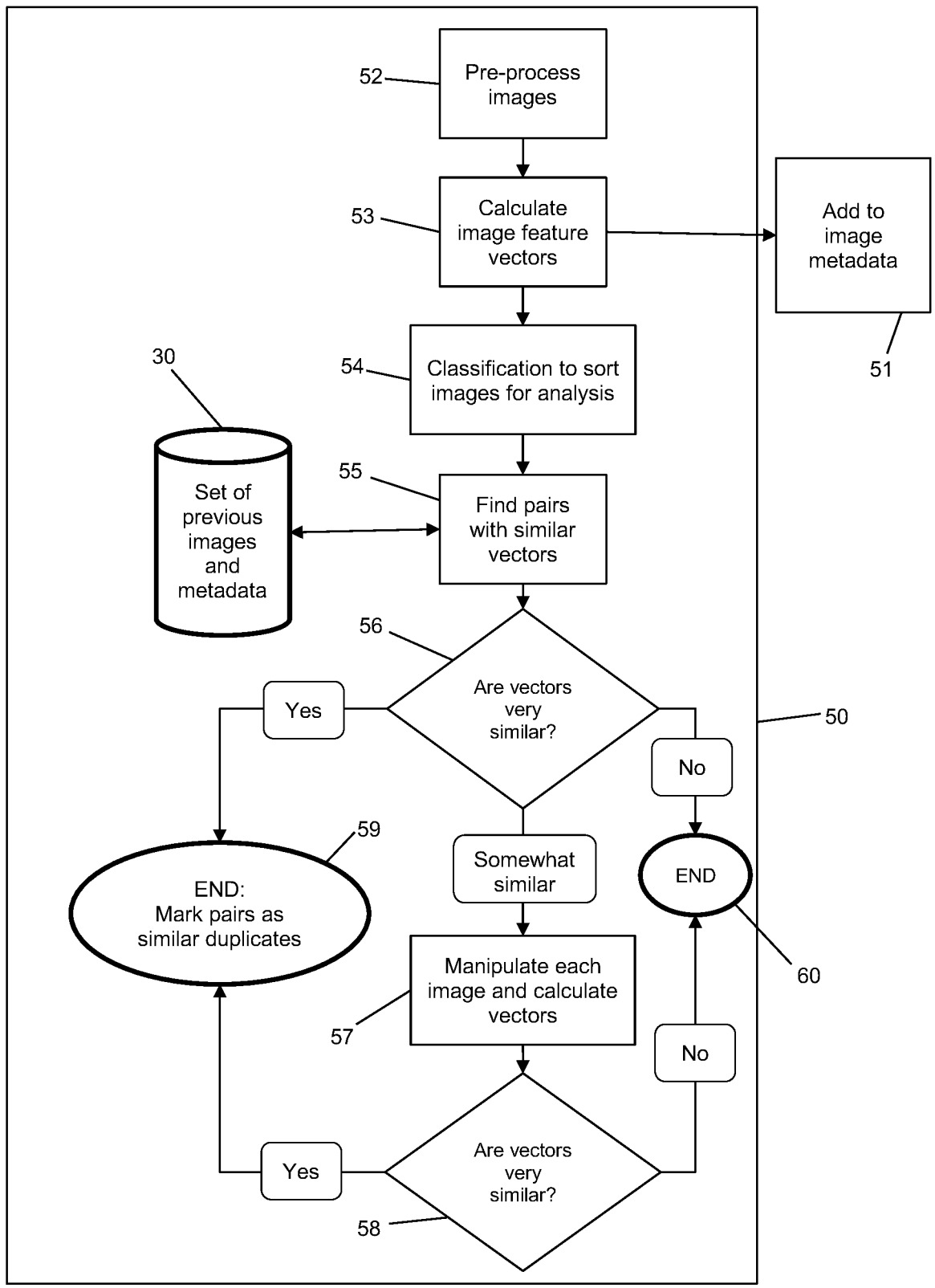
FIG. 2 is a flow chart showing a process for determining perceptually similar duplicates according to an embodiment.

FIG. 2 shows an embodiment of the process for finding perceptually similar duplicates according to step 50. Images that have been altered could be re-used by contractors and resubmitted for later workorders. The manner of altering the images could be any of those listed below and may be achieved using image manipulation software or by simply taking a photograph of a previously used image. One aspect of matching perceptually similar duplicates is to match duplicated images which have been modified in some manner, including, but not limited to:

Image rotations (90 deg, 180 degrees) and/or left-right flips;
Changes in image resolution or jpeg compression;
Colour and/or contrast changes, such as to black and white or colour or having image filters applied to the image;
Flares or lighting changes;
Changes in focus/blurring;
Direct manipulation (objects pasted into images or two or more images pasted together);
Image cropping;
Small image rotations (5-10 degrees); and/or
Image stretching (including changes in aspect ratio).

Another aspect of matching perceptually similar duplicates is to match images that show the same subject matter, but were taken at slightly different times and/or from slightly different angles. This may include two different photographs that were taken at one worksite that each show almost the same features.

Figure 4:
FIG. 4 is a pre-processed image according to an embodiment.

An optional first part of matching perceptually similar duplicates is to pre-process 52 the image(s) of the batch to be compared. Images may have a black or coloured border at the top, bottom and/or one or both sides, such as the information bar 81 on image 80 shown in FIG. 3. To ensure that any borders are discounted from image processing, the top, bottom, and/or sides of an image in the batch having a border are removed, which may facilitate more accurate image comparison. The amount of the image to be cropped may be determined by the system based on the size of the detected border. The images submitted may be landscape, portrait, square or any possible aspect ratio. To assist in providing an accurate comparison, the top, bottom and/or sides of the images in the batch may be cropped to provide, for example, a square pre-processed image. For example, a portrait image may have the top and bottom cropped, or a landscape image may have the sides cropped to each provide a square pre-processed image. A square image that has been submitted in a batch and which does not include a border may not need to be pre-processed as it is already square. FIG. 3 shows box 86 to signify how the image 80 may be cropped during pre-processing. FIG. 4 shows pre-processed image 90 that is created by the above process. Images which do not contain a border may be similarly pre-processed to create a pre-processed image, depending on their aspect ratio. The system may automatically detect images that have borders or information bars and the aspect ratio of the images and may make an assessment of whether any pre-processing is required. It will be noted that a pre-processed image created through cropping the submitted image may result in part or all of one or more objects of interest being obscured, not shown in FIG. 4, however this is an accepted outcome of the perceptually similar deduplicating process. However, the whole image will be utilised for the object of interest detection process.

Importantly, an image feature vector (hereafter 'vector') is calculated for each image under investigation, as at step 53 of FIG. 2. The image under investigation may be a pre-processed image where pre-processing has taken place. The vectors are preferably created through a deep learning neural network that analyses the pre-processed images. Some further information about neural networks is provided below in relation to object of interest detection and can equally be applied to the neural network utilised to generate image feature vectors in the perceptually similar duplicates matching step. According to a preferred example a trained ResNet-based (Residual neural network) deep learning neural network model is used to perform the image analysis and create a vector for each image. For example, such a Resnet model is described in the paper titled 'Deep Residual Learning for Image Recognition' by Kaiming He et al., submitted at Cornell University on 10 Dec. 2015 (available at https://arxiv.org/abs/1512.03385). The vector encodes information about real-world objects, shapes and visual features within the image. In one example, the vector consists of 1024 floating point values, which are derived from a ResNet-34 model. This is a 34 layer model that generates 512 7 by 7 tensors in the second to last layer. This embodiment takes the mean and the max value of each tensor, resulting in a vector of 1024 values. As desired, vectors of different lengths, such as 256, 512 or 4096, could be used based on differently sized ResNet models and different summarisation approaches. The image feature vector for an image will be added to the metadata for that image at step 51 in the data storage 30.

Next, the images are classified by type and then sorted for further analysis, see step 54 of FIG. 2. For example, the type of image may determine the treatment required to match perceptually similar duplicates. The type of image may include photographs of natural scenes referred to as natural images, textual images such as documents or views of computer, tablet or smartphone screens, which may be taken using a screen grab function or otherwise and may include maps, wiring diagrams, plans or text interfaces. For the processing steps to follow, the system is concerned with natural images, therefore a deep learning classification model is utilised to separate out the natural images in the batch. Images which are not natural images are not further processed to assess whether they are perceptually similar duplicates in this embodiment. In other embodiments, and depending on the nature of the workorder being processed and industry sector involved, it may be preferable or necessary to match perceptually similar duplicates of those images that are not natural images.

Where necessary, images to be processed can be further separated into classifications which may be based on their content. Natural images may be grouped together based on objects of interest deemed to be present. For example, images may be grouped together if they contain heavy machinery, others may be grouped if they contain hazardous material or hazardous material handling equipment, or images may be grouped if they contain pipes or valves. Grouping images in this manner may increase the speed of processing and accuracy of the results as perceptually similar duplicates may only be sought from images classified into the same group. In addition, thresholds for calculating similarity of images within a certain group and business rules for the instructing organisation may be tailored to that group. For example, images that may contain objects of interest that will incur a high cost to the organisation sending the workorder may be scrutinised more closely than images which contain lower cost objects of interest.

Next, at step 55 of FIG. 2, the system will compare images to match pairs of images having similar image feature vectors. This analysis may be carried out between images within the batch as well as between an image in the batch and previous images from the data storage 30. To perform this analysis, the system may calculate the distance between vectors of each two images being compared. The distance between vectors is a measure of the degree of perceptual similarity between those images. The distance may be measured using any known distance measure, including L1 (so-called Manhattan distance) or L2 (Euclidean distance). In this embodiment, L1 may be particularly suitable for performing the analysis.

When comparing the images to match whether an image of the batch can be paired with another image as a perceptually similar duplicate, it is very preferable to avoid performing a direct comparison between the batch image and all of the images saved to the data storage. Therefore, techniques to reduce the computation time when performing these comparisons may be utilised. For example, the grouping of natural images as discussed at step 55, where performed, may be used such that images from a certain group are only compared to other images classified to that group. Nearest neighbour algorithm techniques are available to reduce the number of comparisons to be performed. An approximate nearest neighbour index may be used to efficiently find pairs of images with small image feature differences. There is a trade-off between accuracy (recall) which reduces as the computational speed improves when using nearest neighbour techniques. In developing the present invention, the 'Annoy nearest neighbour' technique was utilised. Other algorithms may be utilised which prioritise comparisons between the most likely similar images.

Where necessary and according to the needs of the instructing organisation, further restrictions may be imposed to reduce the number of vector distance calculations to perform. For example, the images which are selected from the data storage to be analysed against an image of a workorder batch may be limited to a subset of images which were previously submitted by the contractor or business partner in question and/or to include entities determined as being closely related.

Therefore, for each image in the workorder batch a set of candidate images is selected for comparison, and vector distance measures are analysed for the batch image and the candidate images. At step 56, images selected from the candidate images that have small vector distance measures in comparison to the batch image will be identified. The vectors for pairs of images are very similar where the distance measure between them is small. A lower threshold, or match threshold, will be used to determine a cut off for which pairs of images are considered very similar, when the distance measure is below the match threshold, or potentially similar, where the distance measure is above the match threshold. Where the vectors of each of the pair of images are found to be very similar, the pair of images will be marked as a perceptually similar duplicate 59.

Figure 5:
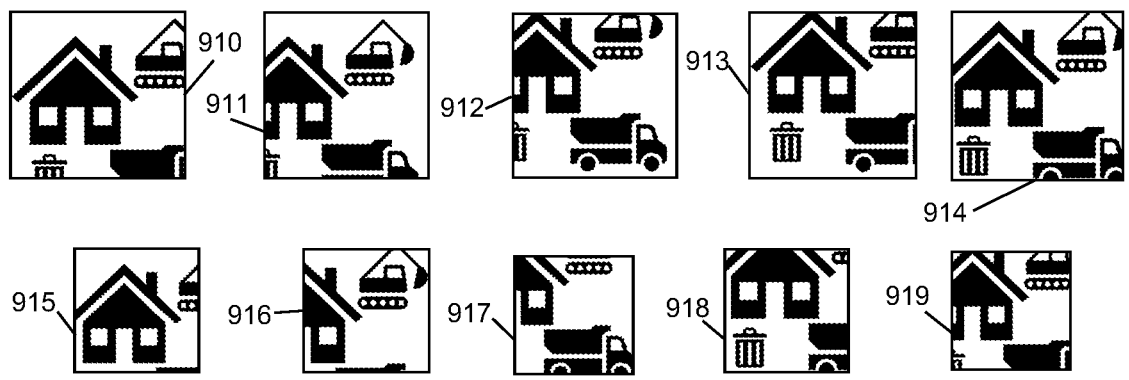
FIG. 5 shows ten examples of cropped versions of an image after manipulation according to an embodiment.

The vectors of the pair of images are not similar when the distance measure between the vectors is large. An upper threshold, or no-match threshold, will be used to determine a cut off for which pairs of images are not similar, when the distance measure is above the no-match threshold, or potentially similar, when the distance measure is below the no-match threshold. Where the vectors of each of the pair of images are found to be not similar, i.e. above the no-match threshold, the pair of images will not be marked as similar and the process 50 will end 60.

Where the distance measure between the vectors of the pair of images is not below the match threshold or above the no-match threshold, the pair of images will be determined as being potentially similar. In other words, the pair of images falls between the upper and lower thresholds and a confident determination of whether the images are or are not similar may not be made. Pairs of images in the potentially similar category will require further processing and analysis to determine whether the pair of images should be classified as perceptually similar duplicates or not. The calculation of vector distances between pairs of images as discussed above may be effective in matching pairs of duplicated images where one of the images has undergone any one or more of image rotation (by 90 or 180 degrees), changes in image resolution or jpeg compression, left/right flips, colour and/or contrast changes, flares or lighting changes, changes to focus and/or blurring and/or direct manipulation including pasting of objects into an image. The perceptually similar duplicate determination process may also match images which are not identical but which were taken at a slightly different time or show a slightly different angle compared to another image. For example, this may include photographic images that were taken in close proximity to one another at the same worksite. In general, the potentially similar pairs of images may have one image that has been cropped, undergone a small rotation (about 5 to 10 degrees) and/or image stretching compared to the other image and may require further processing to determine whether they are perceptually similar duplicates.

Where a pair of images is found to be potentially similar, these images will be further processed to assess whether they are a perceptually similar duplicate. In order to make an assessment of whether one of the potentially similar images is a cropped portion of the other image, a set of cropped versions of the image from the workorder being assessed is created. For example, FIG. 5 shows ten possible cropped versions (910, 911, 912, 913, 914, 915, 916, 917, 918, 919) of the pre-processed batch image of FIG. 4. Each cropped version is a square to assist in comparing the cropped versions to an image that has been pre-processed to be square. Preferably, a few hundred cropped versions of the images are created by using a plurality of zoom and crop values. In other words, the image will be cropped and/or zoomed to some degree to create a first cropped version, the cropping location and/or zoom value will then be changed to create another cropped version from the image. This process may be continued until a predetermined number of cropped versions is created for the image. For example, the process may create about 50, 100, 150, 200, 250, 300, 350, 400, 450, 500, 550, 600, 650, 700, 800, 900 or 1000 cropped versions of the image from the workorder. A similar process is followed to create a predetermined number of cropped versions of the previous image of the pair. For example, the process may create about 50, 100, 150, 200, 250, 300, 350, 400, 450, 500, 550, 600, 650, 700, 800, 900 or 1000 cropped versions of the previous image.

Image feature vectors are calculated for each of the cropped versions of the image from the workorder and for the previous image of the pair of potentially similar images, at step 57 of FIG. 2. The manner in which the feature vectors is calculated is preferably the same as the method discussed above in relation to step 53, such as using the same deep learning neural network which may be a trained ResNet-based deep learning neural network model. The vector of each cropped version of the first image of the image pair (the image from the workorder) is compared to the vector of the second image of the image pair through calculating distances between each respective vector. Similarly, the vector of each cropped version of the second image of the image pair (the previous image) is compared to the vector of the first image of the image pair through calculating distances between each respective vector. The distances calculated by these comparisons are compared, at step 58 of FIG. 2, against a threshold value. When any of the calculated distances is less than the threshold value the pair of images under consideration will be marked as perceptually similar duplicates and the process will end at step 59. According to embodiments, the threshold value may be the same as the lower threshold value previously used.

Figure 6:
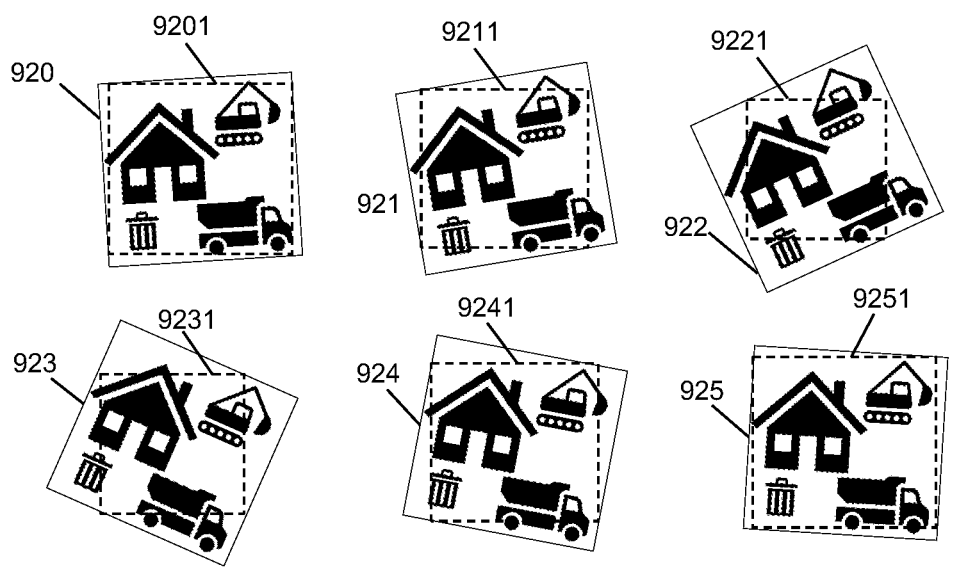
FIG. 6 shows six examples of rotated versions of an image after manipulation according to an embodiment.

In a similar manner, the pair of potentially similar images may be manipulated and tested to see if one of the images of the pair has undergone a slight rotation compared to the other image of the pair and/or one of the images is stretched compared to the other image of the pair, at step 57 of FIG. 2. Thus, the first image of the image pair (the image provided for the workorder) is manipulated through rotation to create a set of rotated versions. For example, FIG. 6 shows six possible rotated versions (920, 921, 922, 923, 924, 925) of the pre-processed batch image of FIG. 4. The central square section (9201, 9211, 9221, 9231, 9241, 9251) of each of the rotated versions (920, 921, 922, 923, 924, 925) will be used for the comparison to other images (which are similarly square images). Similarly, this process is followed to create a predetermined number of rotated versions of the second image of the pair (the previous image). According to the present preferred embodiment, 4 to 8 rotated versions for each image was found to be sufficient. However, another number of rotated versions may be created where desired. The vector of each rotated version of the first image of the image pair is compared to the vector of the second image of the image pair and the vectors of each of the cropped versions of the second image through calculating distances between each respective vector. Similarly, the vector of each rotated version of the second image of the image pair is compared to the vector of the first image of the image pair and the vectors of each of the cropped versions of the first image through calculating distances between each respective vector. The distances between the vectors of each rotated version of the first image and the vectors of the second image and each cropped version of the second image of the image pair are compared, at step 58 of FIG. 2, against a threshold value. Similarly, the distances between the vectors of each rotated version of the second image and the vectors of the first image and each cropped version of the first image of the image pair are compared against the threshold value. When any of the calculated distances are less than the threshold value the pair of images under consideration will be marked as perceptually similar duplicates and the process will end at step 59. According to embodiments, the threshold value may be the same as the lower threshold value previously used or to the threshold value used for comparing vectors of cropped versions of the images.

Figure 7:
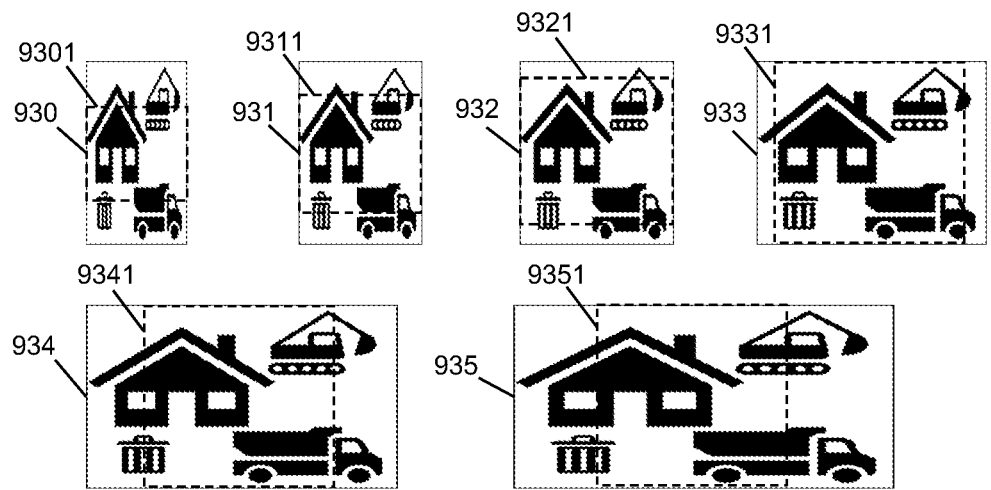
FIG. 7 shows six examples of stretched versions of an image after manipulation according to an embodiment.

In addition, the first image (the image provided for the workorder) is manipulated through stretching to create a set of stretched versions. For example, FIG. 7 shows six possible stretched versions (930, 931, 932, 933, 934, 935) of the pre-processed batch image of FIG. 4. The central square section (9301, 9311, 9321, 9331, 9341, 9351) of each of the stretched versions (930, 931, 932, 933, 934, 935) will be used for the comparison to other images (which are similarly square images). Similarly, this process is followed to create a predetermined number of stretched versions of the second image of the pair (the previous image). According to the present preferred embodiment, 4 to 8 stretched versions for each image was found to be sufficient. However, another number of stretched versions may be created where desired. The vector of each stretched version of the first image of the image pair is compared to the vector of the second image of the image pair and the vectors of each of the cropped versions of the second image through calculating distances between each respective vector. Similarly, the vector of each stretched version of the second image of the image pair is compared to the vector of the first image of the image pair and the vectors of each of the cropped versions of the first image through calculating distances between each respective vector. The distances between the vectors of each stretched version of the first image and the vectors of the second image and each cropped version of the second image of the image pair are compared, at step 58 of FIG. 2, against a threshold value. Similarly, the distances between the vectors of each stretched version of the second image and the vectors of the first image and each cropped version of the first image of the image pair are compared against the threshold value. Similarly, the stretched versions of each of the first and second images may be compared against each rotated version of the second and first images, respectively, and compared against a threshold value. When any of the calculated distances are less than the threshold value, the pair of images under consideration will be marked as perceptually similar duplicates and the process will end at step 59. According to embodiments, the threshold value may be the same as the lower threshold value previously used or to the threshold value used for comparing vectors of cropped versions and/or rotated versions of the images.

After the manipulations, analysis and comparisons according to steps 57 and 58 of FIG. 2 are completed, if a pair of potentially similar images is not found to be very similar, in other words below the respective threshold value, for each manipulation and comparison carried out of that pair of images, the process is ended at step 60. If a pair of images having the distance between their vectors compared to the threshold is found to be a pair of perceptually similar duplicate images (step 59) after any manipulation and vector distance comparison then no further manipulations need be carried out on those images, since it has already been found that they are perceptually similar duplicates.

At step 20 of FIG. 1, the images of the batch of the respective workorder are subject to modelling to detect whether any objects of interest are present therein. Any suitable machine learning or neural network model or algorithm may be used for this purpose. According to the present embodiment, a neural-network based method, such as Single Shot Detector (SSD) (for example, as described in the paper titled 'SSD: Single Short Multibox Detector' by Wei Liu et al., submitted at Cornell University on 8 Dec. 2015 (available at https://arxiv.org/abs/1512.02325), is used to detect objects of interest. In another possible embodiment, a feature points based object identification method is used. According to that method, the image is processed to detect feature points such as SURF feature points (For example, see the paper titled 'Speeded-up Robust Features (SURF)' of Herbert Bay, et al., Computer Vision and Image Understanding Vol 110, Issue 3, June 2008, pp 346-349) followed by a classification algorithm, such as Random Forest classifier or multi-class SVM classifier for object identification'.

Figure 8:
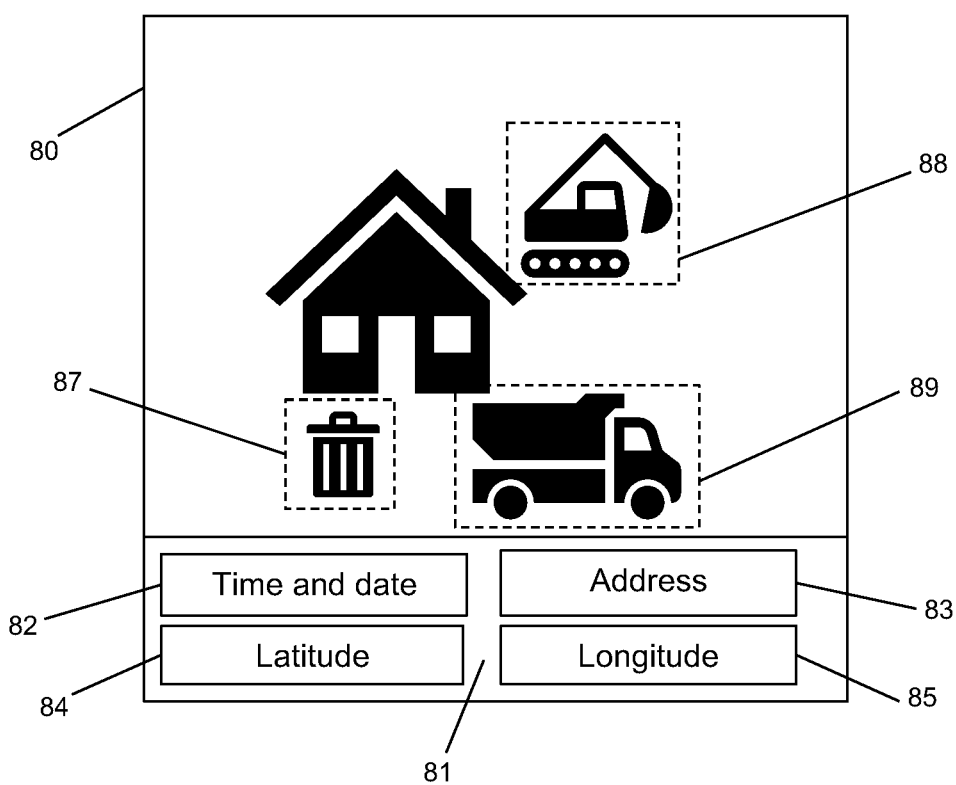
FIG. 8 shows the example of an image of FIG. 3 after undergoing an embodiment of an object of interest identification process.

A neural network based object detector method generally requires a training phase. In the training phase, marked images of objects of interest are used to train the neural network (further described below). Once trained, the neural network is ready to identify likelihood of existence of objects of interest. According to preferred embodiments, the method may include automatically drawing a bounding box around each object of interest within the image. FIG. 8 shows the previous image 80 of FIG. 3 which has undergone an object of interest identification process. As can be seen in FIG. 8, bounding box 87 surrounds an image of a trashcan, bounding box 88 surrounds an image of an excavator and bounding 89 surrounds a truck. Optionally, the bounding box may be characterized by four numbers [x, y, w, h] where: x is the x-axis location of the upper left corner of the bounding box; y is the y-axis location of the upper left corner of the bounding box; w is the width of the box; and h is the height of the box. The values of [x, y, w, h] may be in number of pixels.

When the system performs the method of locating objects of interest, it will preferably provide at least one if not all of the following: a bounding box; an object label, for example 'trashcan' for bounding box 87; and a confidence value. Some embodiments may recognise the presence of an object of interest within images without providing a bounding box around the object of interest. The confidence value is a determination of the confidence the system has calculated that the particular object of interest has been identified and is represented by a value from 0 to 1. A confidence value closer to 1, such as 0.9, corresponds with a high confidence and lower values closer to 0 correspond with a low confidence. The confidence values output by the neural network may vary depending on the visual properties of object of interest being sought.

As noted, the present methods may employ an artificial neural network. The artificial neural network methods are a type of machine learning method which use a collection of connected units or nodes which transform a group of inputs into an output using a weighted combination of input values. The output is generally transformed using a non-linear function followed by multiple layers of such nodes. The equation below represents the high-level functionality of an artificial neural network node.

$$y = f(\Sigma w_i x_i + b)$$

Neural networks must be trained initially to be ready for use in its desired purpose. For example, backpropagation methods may be used which provide the neural network with a set of inputs that each have 'ground truth' annotations. This means that inputs are provided where the outcome, related to the purpose of the neural network, is known. Ground truths are in many cases created by human annotators who can identify the desired feature in the input. In the present embodiment, the inputs are images and the ground truths will be the presence or absence of objects of interest in those images. The output of a training process is a set of weights (values) which are used to generate output for a new input data, a process called inferencing. In other words, based on the neural networks experience gained from known inputs, the learning may be put into practice to determine whether objects of interest are present in new images which do not have associated ground truths. Preferably, the neural network employed in the system for an organisation in a particular industry sector will be trained to locate objects which relate to the work items that may be present in evidence images for workorders in that industry sector.

For the present embodiment, image samples were collected and reviewed by a user familiar with the visual characteristics of each object. Candidate image samples may depict one or more objects of interest, from a large number of possible objects of interest therein. Where an object is present, the user annotates the image with a bounding box around the object of interest and with an accompanying label using a computer based annotation software. The label for an object of interest is chosen to identify that object, e.g. trashcan. An image annotation tool was employed by the user to annotate the image. In this case the image annotation tool utilised was Microsoft VoTT™ (Visual Object Tagging Tool), which permits bounding boxes to be easily drawn around objects of interest. Using these methods, the user uses the annotation tool to generate a selection of image samples which each contain bounding boxes around objects of interest with labels. These image samples are input into the neural network to train the network. The neural network will learn to recognise features of the objects of interest from the annotated images inserted by the user. When the model has been trained for objects of interest, the new set of weights are used with the neural network algorithm to detect the presence or absence of objects in an image that is inserted. The object detection part of the system may output one or more labels, each label representing an object, and a confidence value for each object detected. Optionally, the system may draw a bounding box around the object within the image.

According to a preferred embodiment, the present purpose of locating objects of interest in a batch images of a workorder utilises a single shot detector (SSD) neural network method, as mentioned above. The SSD method provides a good performance for detecting objects of interest within input images. According to another embodiment, the method may employ a multi-label image classification. When utilising multi-label image classification, the method may be restricted to identifying the presence of a class of object, or a specific object, within an image without detecting the location of the object(s) or providing a count of the objects or classes of object. An example of a class of object is heavy vehicle, for example, as may be denoted for the images within bounding boxes 88, 89 of FIG. 8.

As has been noted above, the neural network part of the system will provide a confidence value relating to the presence of an object within an image. In some embodiments, a confidence threshold is used to determine whether the confidence value provided by the system signifies a true detection of the object of interest in the image being analysed. A confidence value below the threshold will be considered as being a false detection of the object within the image.

A preferred method using thresholds will utilise two thresholds rather than one. The first threshold is an upper threshold, known as a positive threshold, and is used to indicate the presence of an object in an image. When the confidence value is above the positive threshold the system finds this a detection of the object of interest in the image. The second threshold is lower than the positive threshold and is known as a negative threshold. The negative threshold may be selected such that confidence values below this value will be considered as determining that the object is not present. Confidence values between the positive and negative thresholds imply that the system is unable to clearly determine whether the object of interest is depicted in the image or not within a determined certainty. For that object, the image may be marked as 'maybe' or 'uncertain' and may require further analysis or review to determine whether the object is present in the image or not. The results of the further analysis, which may be by human review, may be fed back into the system such that when the neural network is retrained improved accuracy is achieved based on the feedback.

The neural network may be tested by the user by reviewing the image outputs above the positive threshold to review that they are indeed true positives. Similarly, the user may review the image outputs with confidence values below the negative threshold to ensure that they are all true negatives. Thus the precision of the system may be tested and where necessary the positive and negative thresholds may be selected to ensure a high precision. A desired precision may be selected and the positive and negative thresholds may be selected to provide outputs within that precision, which may require further review of the outputs or training of the neural network initially. The thresholds used by the neural network may be tailored for each object of interest being sought. For example, an object of interest with a high associated cost may have a comparatively high positive threshold and low negative threshold, to ensure that this object is not incorrectly classified by the system. This implies that more images that are likely to contain that object of interest fall into the 'maybe' category and may be more closely scrutinised. Similarly, the positive threshold may be set lower and the negative threshold set higher for an object of interest with a low associated cost to reduce the number of cases falling in the 'maybe' category, where closer scrutiny of the images may be unwanted.

To summarise the above, images where the confidence value for a certain object is above the positive threshold are passed by the system as confident the object is present in the image. Images where the confidence value for an object is below the negative threshold are passed by the system as confident that the object is not present in the image. The images where object confidence values are between the negative and positive thresholds are marked as 'uncertain' or 'maybe' and may be sent for manual processing or further consideration. Where necessary, based on the result of the confidence threshold comparison, the image metadata may be updated to denote whether an object is present within that image. In other words, where the system determines that an object is present in an image with confidence above the positive threshold, the image metadata may be updated accordingly to denote that object as being present in the image, and potentially an amount of misclassification of images in relation to this object may be tolerated. Where the system determines that an object is not present in an image with confidence below the negative threshold, the image metadata may be updated accordingly to denote that object as not being present in the image.

A final step of the process shown in FIG. 1 is to classify the workorder and images into decision classes 40. The system preferably performs geo-location and time comparisons. This may utilise location and time information extracted for each image of the workorder batch at step 16, where available, or information taken from optical character recognition (OCR) of the image at step 17, where available. The workorder is preferably accompanied by workorder metadata information which states where the workorder is carried out, i.e. location the work is to be performed, and the time the work is carried out, i.e. the date and time the work is to be completed. The location in the workorder information is compared to the location stored in the metadata of each image. According to preferred embodiments, locations will be compared in the same format and where necessary the system may convert a location stored in one format to another common format. When performing the comparison between the workorder location information and the image metadata information, the system will calculate the distance between the workorder information location and the image metadata location. A threshold may be placed on the location comparison to limit accepting images which are only within a predetermined distance of the workorder location. For example, the maximum acceptable distance from the required location for the metadata location of an image may be 50 metres, 100 metres, 200 metres or another distance. When the image metadata places the image outside of the maximum range from the workorder location, the image may not be accepted for further processing.

A similar comparison is conducted between the time of the workorder information to the time stored in the image metadata. A threshold time range from the instructed time of the workorder may be selected. For example, depending on the task, thresholds of 1 day, 2 days, 3 days, 4 days or 5 days within the time when the workorder was instructed may be accepted when processing the image. Any images with time metadata outside the threshold time range may not be accepted for further processing. The images which are within the geo location and timeframe thresholds will be kept for further processing.

Once the previous image processing steps have taken place, the workorder processing system may utilise the outcomes and image processing to classify the workorder evidence. In addition, some parts of the evidence may be manually entered into the system, particularly where the evidence does not include photographic evidence of the presence of the object. For example, a receipt associated with payment for use of an item may have been submitted. When created the workorder created may include the following information which determines the evidence that is required: date and/or time work is to be performed or was claimed to have been performed; location work is to be performed; and work items to be completed, which are the work tasks associated with the workorder. Each work item of the workorder may have a set of objects of interest for which evidence is required to validate that the work item has been completed. When all objects of interest are located in the evidence provided in the form of images for all of the work items, the correct completion of the workorder can be validated by the workorder processing system.

Therefore, the workorder processing system according to the preferred embodiment will determine whether each image provided as evidence was taken at the required location (within a distance threshold) and at the required date and/or time (within the timeframe threshold). Any images which were outside the required location or timeframe will be removed from consideration and not used to determine whether the workorder can be validated. The workorder processing system will determine whether any exact duplicates exist between the images submitted in a batch and the images stored from previous evidence. The workorder processing system will also determine whether any perceptually similar duplicates exist between each image of the batch and the storage of previous images. Any exact duplicates and perceptually similar duplicates matched will be removed from consideration when validating the workorder. Each of these steps will filter out images which should not be considered and leave a filtered set of images which are not exact or perceptually similar duplicates and which were taken within the threshold range of the workorder location and time.

The filtered set of images is computer processed individually by the system to determine whether each of the objects of interest of the workorder in question are present within the set of images. Dependant on the outcome of the processing to determine whether all of the objects of interest are present, the workorder evidence will be classified into at least a 'pass' when all objects of interest are present or 'fail' if all of the objects of interest are not present.

According to preferred embodiments, after the computer processing has been conducted by the workorder processing system the workorder evidence will be classified into three classifications as follows:

'Pass', when the workorder processing system is confident that evidence for each of the objects of interest has been provided in the images submitted;

'Fail', when the workorder processing system is confident that the image submitted are lacking evidence of at least one object of interest; or 'Alert', when the workorder processing system has at least one object of interest which it is 'uncertain' if present or not present in the images submitted or which 'maybe' present in those submitted images, and where the workorder processing system is confident that each other object of interest is present in the images submitted.

Where the system has returned the classification 'alert' for a batch of submitted images, the system may transmit the evidence to a user for manual processing together with the outcome of the processing conducted by the workorder processing system's software. In addition to the above categories, a further category may exist for situations where the system has determined that an image may have been manipulated prior to being provided by the contractor or employee. Evidence in those categories may also require further manual attention to make an assessment whether the image manipulation was an act of potential fraud or not. Thresholds may be adjusted according in relation to a contractor, for example, who has in the past submitted manipulated images as evidence, to ensure that evidence from that contractor is more closely scrutinised manually.

Any images processed by the workorder processing system, other than those which are exact duplicates of previous images, are saved to the data storage 30 for use in comparisons against batches of images relating to future workorders.

According to a possible embodiment, the workorder processing system may be adapted to review images to assess how much work has been performed for the workorder in addition to validation of the images. In other words, the system may compare images within a submitted batch to assess how many distinct objects of interest of a certain type have been included in the evidence. For example, a contractor may claim payment for five trenches being dug and provide evidence that includes five images each showing a trench and the system may perform the perceptually similar duplicate analysis discussed above to validate whether five distinct trenches are shown or if any images depict the same trench.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A computer implemented method for classifying workorder evidence provided for a workorder having at least one object of interest and workorder metadata describing at least one required workorder attribute, the workorder evidence comprising an image, the method comprising:

validating the image to assess whether the image is associated with the workorder, wherein validating the image comprises at least one of the following comparison steps:

a) processing any available image metadata as image attributes of the image, and comparing whether the at least one required workorder attribute is matched by any image attribute, the comparison requiring a match; and b) comparing whether the image is a match for any of a plurality of previous images stored in an image storage, the comparison requiring that there are no matches, wherein, the image is valid if the or each comparison step is met, detecting whether the at least one object of interest is depicted in the image, utilising an object detection algorithm capable of identifying the at least one object of interest; and classifying whether the workorder evidence satisfies the workorder based on whether the image is valid and the at least one object of interest is detected.

2. The computer implemented method according to claim 1, wherein step b) comprises determining whether the image is an exact duplicate of any previous image.

3. The computer implemented method according to claim 1, wherein the image and the plurality of previous images is a photograph.

4. The computer implemented method according to claim 1, wherein step b) comprises calculating an image feature vector for the image, wherein each previous image has an associated image feature vector.

5. The computer implemented method according to claim 4, wherein a trained deep learning neural network model is utilised to calculate the image feature vector for the image.

6. The computer implemented method according to claim 4, wherein step b) comprises calculating a distance between the image feature vector of the image and the associated image feature vector of at least some of the plurality of previous images, and comparing each distance to at least one threshold value.

7. The computer implemented method according to claim 4, wherein step b) comprises manipulating the image through at least one of cropping, zooming, rotating, and stretching to create a set of manipulated images, and comparing each manipulated image to a set of comparison previous images, being at least a subset of the plurality of previous images, to determine whether the image is a match to a previous image.

8. The computer implemented method according to claim 7, comprising providing a subset of the plurality of previous images as the set of comparison previous images, where the distance is above a first match threshold and below a second no-match threshold.

9. The computer implemented method according to claim 8, wherein step b) comprises manipulating the set of comparison previous images through at least one of cropping, zooming, rotating, and stretching to create a set of manipulated previous images, and comparing each manipulated previous image to the image, to determine whether the image is a match to a previous image.

10. The computer implemented method according to claim 7, comprising calculating an image feature vector for each manipulated image, and wherein comparing each manipulated image to the set of comparison previous images comprises calculating a distance between the image feature vector of each manipulated image and an image feature vector of each of the comparison previous images, and comparing the distance to at least one threshold value.

11. The computer implemented method according to claim 1, comprising pre-processing the image by cropping at least one edge portion from the image.

12. The computer implemented method according to claim 1, wherein an OCR program reads text on the image, the text being image metadata, as the image attributes of step a).

13. The computer implemented method according to claim 1, wherein the image metadata comprises a location and/or date/time of the image, wherein the workorder attribute comprises a workorder location and/or date/time, and wherein step a) comprises comparing the location and/or date/time of the image with the workorder location and/or date/time.

14. The computer implemented method according to claim 1, wherein the object detection algorithm comprises a trained neural network.

15. The computer implemented method according to claim 1, wherein the trained neural network determines a confidence value of the likelihood whether the at least one object of interest is depicted in the image, and wherein the computer processing system compares the confidence value to at least one of a positive threshold, to determine whether the object of interest is depicted in the image, or a negative threshold, to determine whether the object of interest is not depicted in the image.

16. The computer implemented method according to claim 15, wherein, if the confidence value is below the positive threshold and above the negative threshold, a determination is made that it is uncertain whether the object of interest is depicted in the image or not.

17. The computer implemented method according to claim 16, wherein when an uncertain determination is made, the workload evidence is flagged for further analysis.

18. The computer implemented method according to claim 1, wherein the workorder evidence comprises a plurality of images, wherein each of said plurality of images undergoes at least one of the comparison steps for validation and undergoes detection of the at least one object of interest in the image, and wherein said workorder evidence is classified based on whether the at least one object of interest is present in at least one valid image.

19. The computer implemented method according to claim 18, comprising:

comparing each image of the plurality of images with each other image of the plurality of images to determine whether any exact duplicates exist within the plurality of images, and removing one exact duplicate from each pair of exact duplicates from further processing.

20. The computer implemented method according to claim 3, wherein the photograph is a natural image photograph, wherein a deep learning classification model determines that the image is the natural image photograph.

21. A workorder processing system for classifying workorder evidence provided for a workorder having at least one object of interest and workorder metadata describing at least one required workorder attribute, the workorder evidence comprising an image, the system comprising:

at least one processor; and at least one memory storing instructions which when executed by the at least one processor, causes the at least one processor to perform steps comprising:

validating the image to assess whether the image is associated with the workorder, wherein validating the image comprises at least one of the following comparison steps:

a) processing any available image metadata as image attributes of the image, and comparing whether the at least one required workorder attribute is matched by any image attribute, the comparison requiring a match; or
b) comparing whether the image is a match for any of a plurality of previous images stored in an image storage, the comparison requiring that there are no matches, wherein, the image is valid if the or each comparison step is met, detecting whether the at least one object of interest is depicted in the image, utilising an object detection algorithm capable of identifying the at least one object of interest; and classifying whether the workorder evidence satisfies the workorder based on whether the image is valid and the at least one object of interest is detected.

\* \* \* \* \*